US012061493B2

(12) United States Patent
Li et al.

(10) Patent No.: US 12,061,493 B2
(45) Date of Patent: Aug. 13, 2024

(54) LOW POWER HYBRID REVERSE BANDGAP REFERENCE AND DIGITAL TEMPERATURE SENSOR

(71) Applicant: Intel Corporation, Santa Clara, CA (US)

(72) Inventors: You Li, Hillsboro, OR (US); David Duarte, Portland, OR (US); Yongping Fan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 17/033,571

(22) Filed: Sep. 25, 2020

(65) Prior Publication Data

US 2022/0100221 A1 Mar. 31, 2022

(51) Int. Cl.
*G05F 3/30* (2006.01)

(52) U.S. Cl.
CPC .................................... *G05F 3/30* (2013.01)

(58) Field of Classification Search
CPC ........................................................ G05F 3/30
See application file for complete search history.

(56) References Cited

U.S. PATENT DOCUMENTS 6,292,406 B1 * 9/2001 Le ......................... G11C 16/08 365/230.06
10,268,226 B1 * 4/2019 Wang ........................ G05F 3/30
2008/0067986 A1 * 3/2008 Oyama ..................... G05F 3/30 323/234
2013/0241524 A1 * 9/2013 Inoue ........................ G05F 3/30 323/313

OTHER PUBLICATIONS

Eberlein, Matthias et al., “A 28nm CMOS Ultra-Compact Thermal Sensor in Current-Mode Technique”, 2016 Symposium on VLSI Circuits Digest of Technical Papers, 2 pgs.
Lu, Cho-Ying et al., “An 8b Subthreshold Hybrid Thermal Sensor with ± 1.07° C. Inaccuracy and Single-Element Remote-Sensing Technique in 22nm FinFET”, ISSCC 2018, Session 19, Sensors and Interfaces, 19.1, 3 pgs.

* cited by examiner

*Primary Examiner* — Kyle J Moody
*Assistant Examiner* — Lakaisha Jackson
(74) *Attorney, Agent, or Firm* — NICHOLSON DE VOS WEBSTER & ELLIOTT LLP

(57) ABSTRACT

A low power hybrid reverse (LPHR) bandgap reference (BGR) and digital temperature sensor (DTS) or a digital thermometer, which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

20 Claims, 7 Drawing Sheets

300

500

620

600

LOW POWER HYBRID REVERSE BANDGAP REFERENCE AND DIGITAL TEMPERATURE SENSOR

BACKGROUND

Bandgap reference (BGR) and Digital Temperature Sensor (DTS) are widely used in almost all modern integrated circuits (IC). A BGR provides an accurate voltage source which may be used as reference for internal power supply generation or as a bias voltage for critical circuits, so its performance is crucial to the whole system. A DTS provides information about IC temperature which is important in enabling optimal system performance and also in supporting thermal protection. With the increasing demand for portable devices such as mobile phones, laptops and internet-of-thing (IOT) devices, the low-power and low-cost requirements of the BGR and DTS are becoming more challenging.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
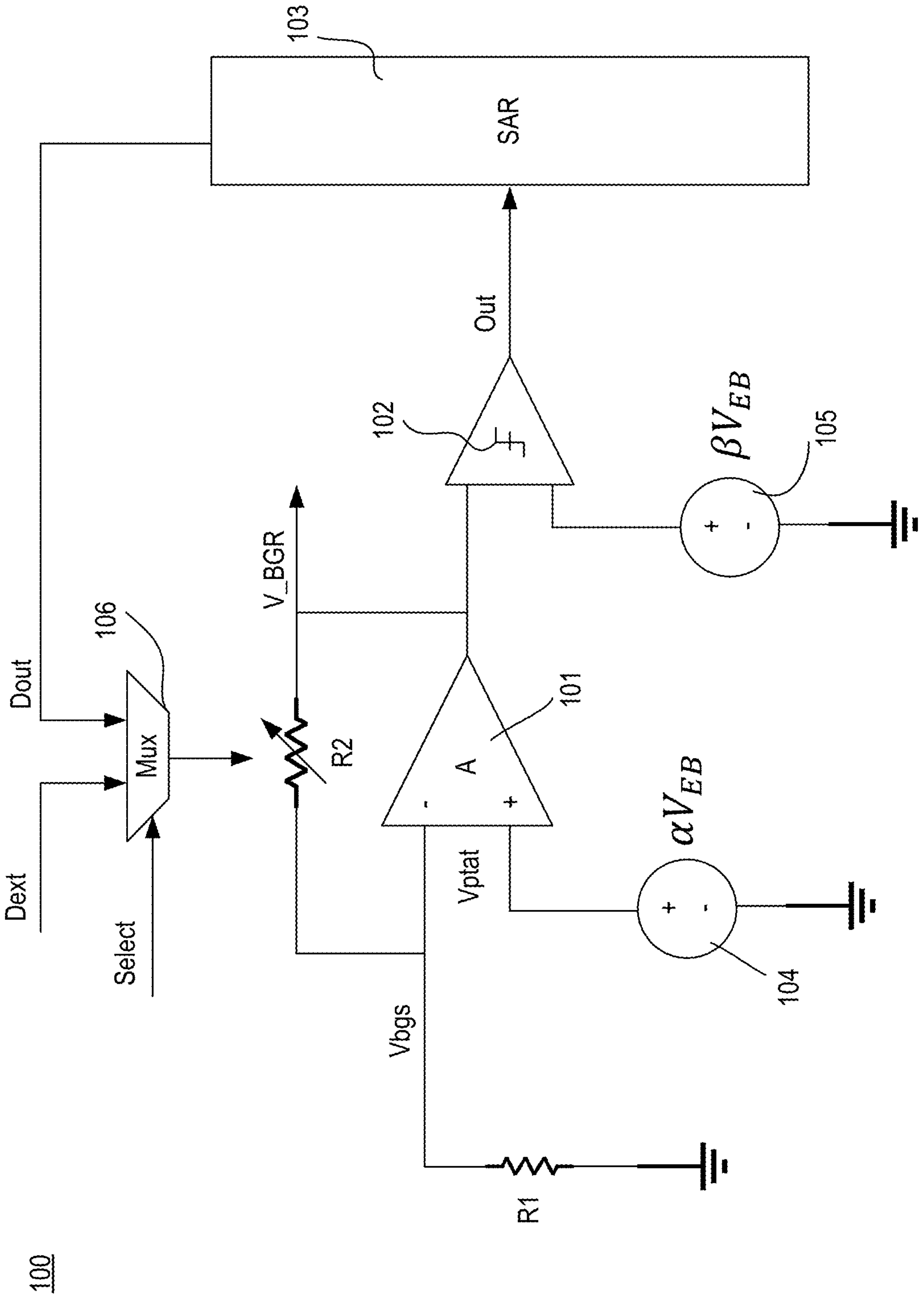
FIG. 1 illustrates a low power hybrid reverse bandgap reference and digital temperature sensor, in accordance with some embodiments.

Traditional BGR/DTS design used in server and client segments employ a pair of BJT devices to generate a proportional-to-absolute-temperature (PTAT) voltage ($V_{ptat}$) and a complementary-to-absolute-temperature (CTAT) voltage ($V_{EB}$). By choosing the appropriate ratio (α), a Bandgap reference voltage can be generated by cancelling the temperature coefficients (TC) of PTAT and CTAT voltage:

$$V_{BGR}=\alpha V_{ptat}+V_{EB} \tag{1}$$

The temperature information can be obtained by comparing $V_{BGR}$ and $V_{EB}$, so an analog-to-digital converter (ADC) is added to perform the comparison and thus implement the DTS function. To obtain reasonable performance, the BJT device ends up using a relatively large footprint, especially in advanced semiconductor process. As a way to limit the area and power requirements, some client and server DTS designs leverage the existing sort and class test conditions to implement two-temperature (two-point) trimming which may not be viable in low cost test environments required by low BOM products. Additionally, traditional BGREFs demand larger currents to bias a pair of BJTs and the matching of such structure is also a critical aspect.

There are many low-power, low-cost BGR circuits reported in the literature. A range of solutions make use of the standard bandgap circuit topology while using MOS-based diodes as the absolute voltage reference source. Since MOS-based diodes are poorly controlled, an extensive trimming methodology (unrealistic in high-volume production) is required to achieve an accurate reference voltage. Another class of circuits implements a low power BGR by utilizing switch capacitors. However, the switch capacitors introduce ripple in the output reference voltage and their PSRR performance is relatively lower.

Various types of low-power, low-cost DTS are developed in the literature. One kind utilizes a resistor to sense the temperature and obtains the temperature information from phase shifts caused by resistance changes in an RC filter or from current changes in a resistor bridge. However, their implementations require silicided poly-silicon resistors and the conversion speed is very slow (in the ms range).

An existing low-power DTS structure requires one-temperature (one-point) trimming and utilizes a pair of NPN devices to generate the PTAT (proportional to absolute temperature) and CTAT (Complementary to absolute temperature) currents. The temperature information can be obtained by tuning a resistor digital-to-analog converter (DAC) to equalize the PTAT and CTAT currents. Since NPN devices are only available in a triple-well process and their availability in low-cost dual-well processes is limited, a variation uses a subthreshold MOS device and parasitic PNP BJT to obtain the PTAT and CTAT currents, respectively. However, both of these designs require a complex external readout circuit as they have a non-linear transfer curve of output code versus temperature. Furthermore, they operate in current mode, which increases design complexity and causes power consumption variations with the output code.

Various embodiments describe a BGR/DTS structure called "low power hybrid reverse" (LPHR) BGR/DTS, which utilizes subthreshold metal oxide semiconductor (MOS) transistor and the PNP parasitic BJT device to form a reverse BGR that serves as the base for configurable BGR or DTS operating modes. The LPHR architecture of various embodiments uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, the LPHR can be configured as a BGR or DTS (or digital thermometer) and comprises a first resistor (R1); an amplifier having a first input (Vin−) coupled to the first resistor, and a second input (Vin+) to receive a scaled emitter-base voltage ($\alpha V_{EB}$); and a second resistor (R2) having variable resistance, wherein the second resistor is coupled to the first input and an output of the amplifier, wherein the output of the amplifier is a bandgap reference (V_BGR). In various embodiments, the amplifier is an unbalanced amplifier having imbalanced input pair size or imbalanced biasing currents. In some embodiments, the amplifier comprises a first input transistor (Q0) having a first size; and a second input transistor (Q1) having a second size, wherein the first size is 'n' times larger than the second size. The amplifier further comprises a current mirror coupled to the first input transistor and a second input transistor; and a current source coupled to the first input transistor and a second input transistor. In some embodiments, the current mirror comprises a third transistor (Q2) which is diode-connected and coupled to the first input transistor, wherein the third transistor has a third size; and a fourth transistor (Q3) coupled to the third transistor and the second input transistor, wherein the fourth transistor has a fourth size, wherein the fourth size is 'm' times larger than the third size. Here, 'm' and 'n' can be any number. For example, n=4 and m=1.

In some embodiments, the scaled emitter-base voltage is a first scaled emitter-base voltage, wherein the LPHR comprises a comparator to compare the output of the amplifier with a second scaled emitter-base voltage ($\beta V_{EB}$). In various embodiments, the second scaled emitter-base voltage is higher than the first scaled emitter-base voltage. In some embodiments, the LPHR is coupled to a successive approximation logic to receive an output of the comparator and to generate a digital code (Dout), wherein the digital code changes according to the output of the comparator. In some embodiments, the digital code is a first digital code, wherein the LPHR comprises a multiplexer to select one of the first digital code or a second digital code (Dext), wherein an output of the multiplexer is to adjust the variable resistance of the second resistor. In some embodiments, when the multiplexer selects the first digital code (Dout), the first digital code indicates a temperature of the LPHR.

In some embodiments, the LPHR comprises a circuitry to generate the first scaled emitter-base voltage and the second scaled emitter-base voltage. In some embodiments, the circuitry comprises: a resistor divider; a current source coupled to the resistor divider; and a transistor coupled to the current source and the resistor divider, wherein the resistor divider has a first tap to provide the first scaled emitter-base voltage and a second tap to provide the second scaled emitter-base voltage. In some embodiments, the transistor is one of a PNP BJT or a PMOS transistor. In various embodiments, the LPHR can be used as temperature sensors in hot spots of a die. The same circuit can also be used as a reference voltage generator.

There are many technical effects of various embodiments. For example, compared with existing low power DTS topologies, the LPHR-DTS of various embodiments can achieve high accuracy with a single temperature trim across a 38% larger working temperature range, using 25% less power and requiring 23% shorter conversion time while providing a linear code to temperature transfer function, for example. The LPHR-BGR achieves better temperature independence and PSRR performance while consuming 0.15× the power of the existing base BGR circuit. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a low power hybrid reverse bandgap reference and digital temperature sensor 100 (herein LPHR circuit 100), in accordance with some embodiments. In some embodiments, LPHR circuit 100 comprises unbalanced amplifier 101, comparator 102, Successive Approximation Register (SAR Logic) 103, first scaled voltage source 104, second scaled voltage source 105, multiplexer (Mux) 106, resistor R1, and resistor R2 coupled as shown. In some embodiments, Mux 106 is used to adjust the resistance of resistor R2 via one of external data ($D_{ext}$) or data $D_{out}$ from SAR 103.

LPHR circuit 100 works as a configurable BGR if $D_{ext}$ is selected and as a DTS if $D_{out}$ is chosen. So, depending on whether LPHR circuit 100 is configured as a BGR or DTS, Mux 106 selects (using Select signal) one of $D_{ext}$ or $D_{out}$. For example, when LPHR circuit 100 operates as BGR, Mux 106 selects $D_{ext}$ to select a resistance of R2 to tune the bandgap reference voltage V_BGR, and selects $D_{out}$ when LPHR circuit 100 operates as a DTS. When LPHR circuit 100 works as a configurable BGR, the output reference voltage $V_{BGR}$ can be adjusted with the input code $D_{ext}$. The output V_BGR (or $V_{BGR}$) is compared with scaled $\beta V_{EB}$ by comparator 102 which generated the output Out for SAR 103.

In various embodiments, amplifier 101 is an unbalanced amplifier working in weak inversion. Some embodiments of amplifier 101 are illustrated with reference to FIGS. 2-3.

Figure 2:
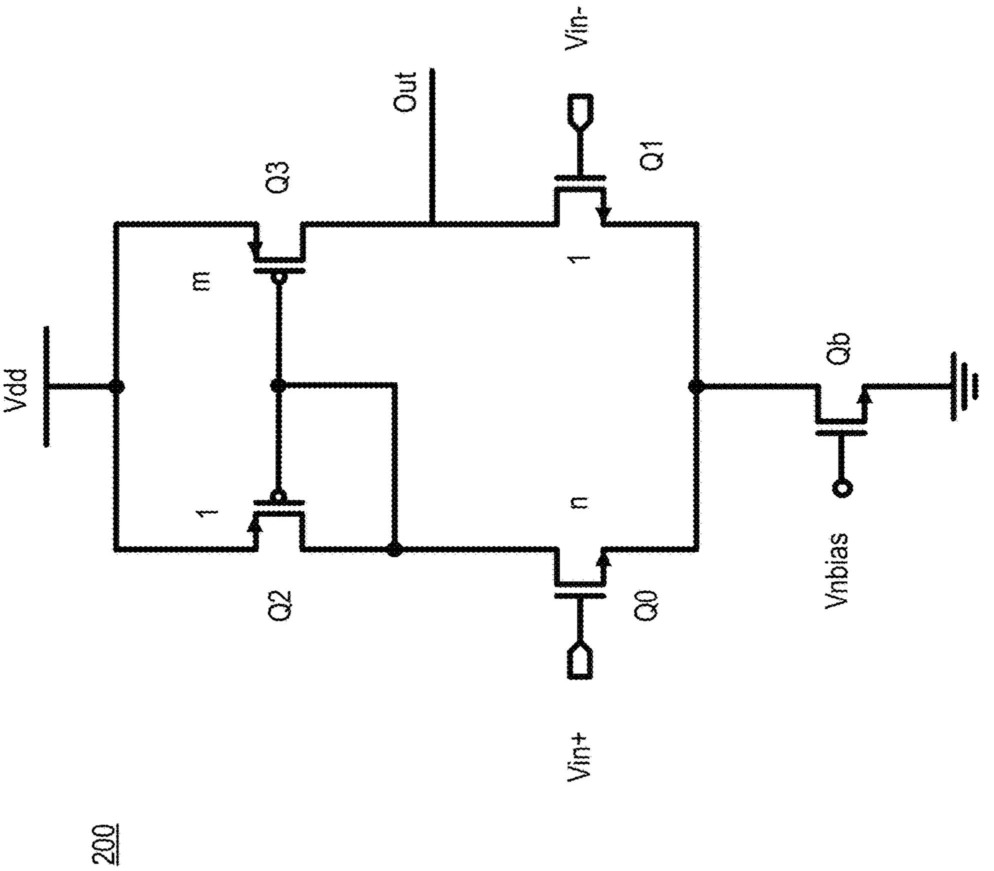
FIG. 2 illustrates an unbalanced n-type input amplifier for the low power hybrid reverse bandgap reference and digital temperature sensor, in accordance with some embodiments.

FIG. 2 illustrates an unbalanced n-type input amplifier 200 for the low power hybrid reverse bandgap reference and digital temperature sensor, in accordance with some embodiments. Amplifier 200 comprises nMOS input transistors Q0 and Q1, current mirror pMOS transistors Q2 and Q3, and an n-type current source Qb biased by Vnbias. Input transistors receives Vin+ and Vin− signals, while output is provided on node Out. Here, node names and signal names are interchangeably used. For example, Out may refer to signal out or node out depending on the context of the sentence.

Figure 3:
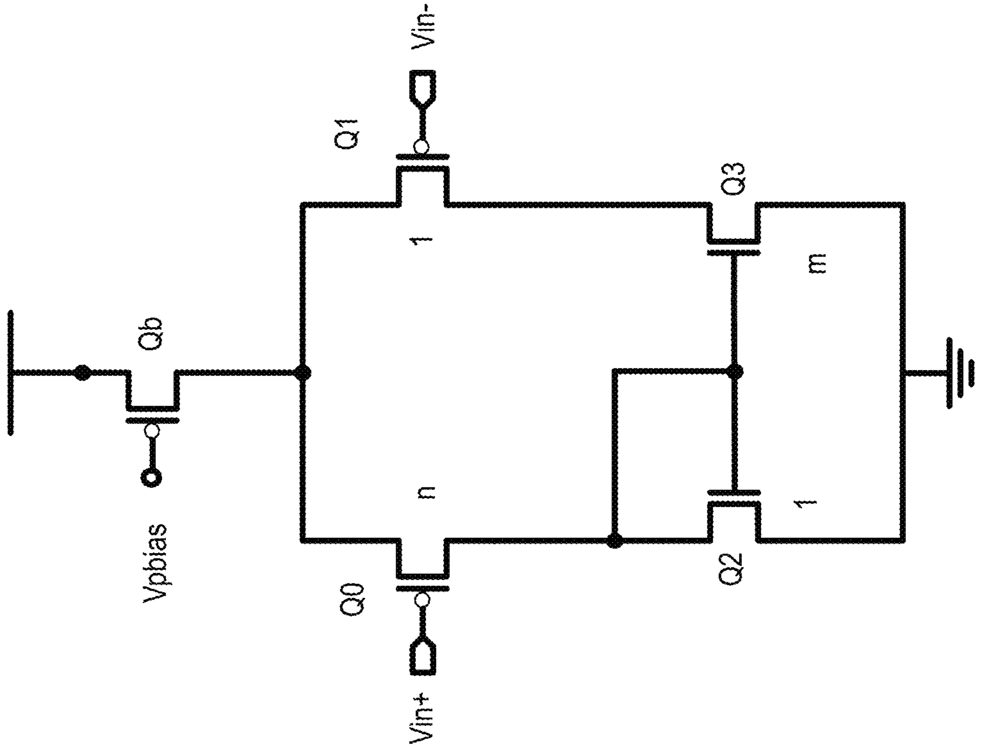
FIG. 3 illustrates an unbalanced p-type input amplifier for the low power hybrid reverse bandgap reference and digital temperature sensor, in accordance with some embodiments.

FIG. 3 illustrates an unbalanced p-type input amplifier 300 for the low power hybrid reverse bandgap reference and digital temperature sensor, in accordance with some embodiments. Amplifier 300 is a flipped version of amplifier 200. Amplifier 300 comprises pMOS input transistors Q0 and Q1, current mirror nMOS transistors Q2 and Q3, and an p-type current source Qb biased by Vpbias. Input transistors receives Vin+ and Vin− signals, while output is provided on node Out. The following section describes the basis of using unbalanced amplifier 200 or 300 for LPHR circuit 100.

If a MOS transistor is biased in weak inversion, the $I_{DS}$ to $V_{GS}$ characteristic is exponential, similar to the BJT:

$$I_{DS} = I_o \exp\left(\frac{V_{GS}}{V_T}\right) \tag{2}$$

Where $V_T$=kT/q is the thermal voltage, $I_o$ is a process related parameter but proportional to the transistor size (W/L). After some manipulation, it can be obtained:

$$V_{GS} = V_T \ln\left(\frac{I_{DS}}{I_o}\right) \tag{3}$$

Therefore, when a pair of MOS transistors are biased in weak inversion, their $V_{GS}$ difference is a function of the ratio of their size and the level of $I_{DS}$. The input pair transistors Q0 and Q1 of amplifier 200/300 operate in weak inversion, and their size ratio is 1:n. Furthermore, their current is also imbalanced by a ratio of m:1 which is set by the current mirror devices Q2 and Q3 in the active loads. Thus, the $V_{GS}$ difference between the input pair transistors Q0 and Q1 (which is also the input voltage difference between $V_{in-}$ and $V_{in+}$, as they share the same source node) is:

$$V_{ptat} = V_{in-} - V_{in+} = V_T \ln(mn). \tag{4}$$

Since $V_T$ increases with temperature with a coefficient=~0.087 mV/° C., it generates a PTAT voltage, and its temperature coefficient (TC) can be set by using specific m (current ratio) and n (input pair size ratio) values. Random mismatch can cause the variations of m and n, but this can be minimized by using large transistor size for input pair and current mirror. The transistors Q0 and Q1 of amplifier 200/300 can be kept in weak inversion region by low current biasing and large transistor sizes.

Figure 4B:
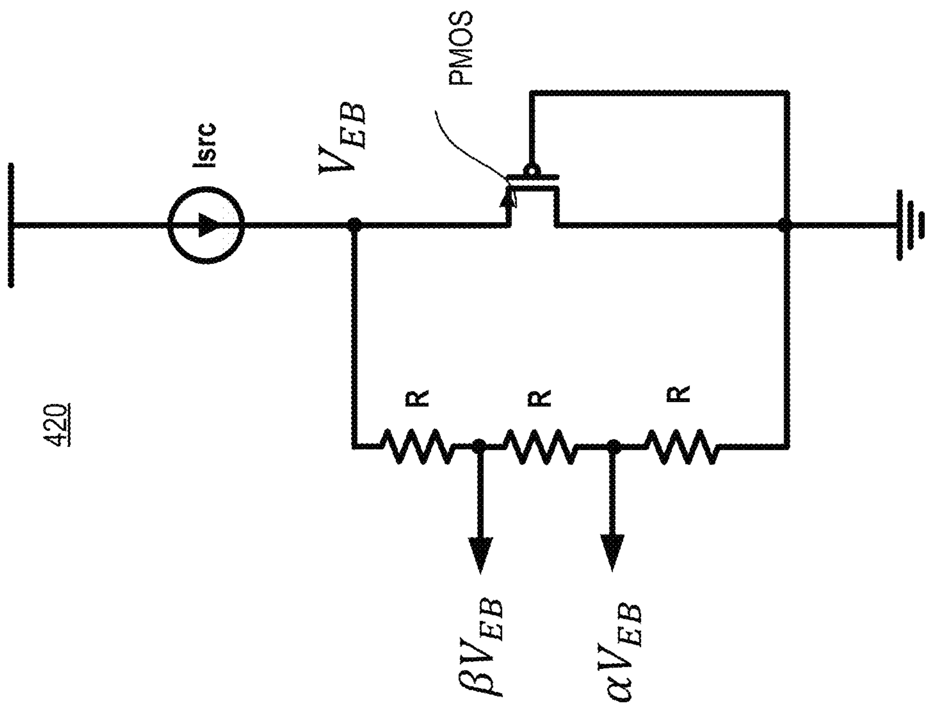
FIGS. 4A-B illustrate circuits to generate scaled emitter-base voltage for the low power hybrid reverse bandgap reference and digital temperature sensor, in accordance with some embodiments.
Figure 4A:
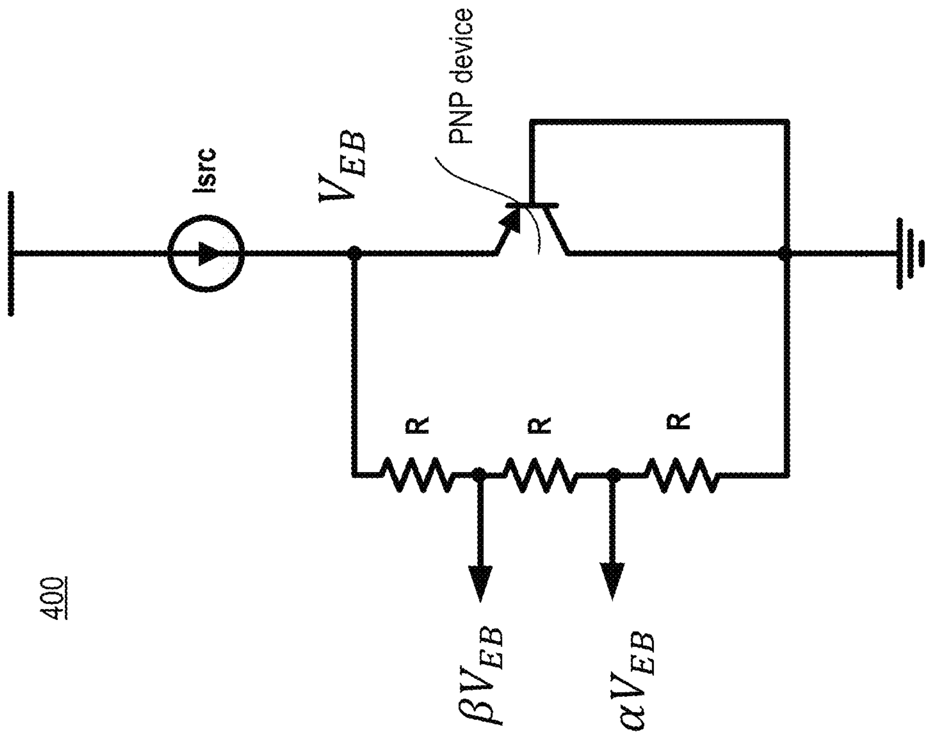

FIGS. 4A-B illustrate circuits 400 and 420, respectively, to generate scaled emitter-base voltage for the low power hybrid reverse bandgap reference and digital temperature sensor, in accordance with some embodiments. The scaled base-emitter voltages ($\alpha V_{EB}$) and ($\beta V_{EB}$) in FIG. 1 are generated by one of circuits 400 or 420. Circuit 400 comprises current source Isrc, a resistor divider network comprising resistors R, and a PNP BJT device coupled as shown. In some embodiments, a current source is applied to bias the PNP device, whose emitter-to-base voltage $V_{EB}$ is widely used in many BGR circuits to generate the CTAT voltage and has a negative TC (e.g., −1.5~1.6 mV/° C.), where TC is the temperature coefficient. The scaled base-emitter voltages ($\alpha V_{EB}$) and ($\beta V_{EB}$) are generated by the resistor ladder of resistors R.

As shown in FIG. 1, a reverse bandgap voltage ($V_{bgs}$) is generated at the negative input node of amplifier 101 by flowing equation, $$V_{bgs} = V_{ptat} \alpha V_{EB} \tag{5}$$

The PTAT voltage ($V_{ptat}$) has a positive TC, while the CTAT voltage ($V_{EB}$) has a negative TC. By setting the correct value for α, their TC can cancel each other, and a reverse bandgap reference voltage ($V_{bgs}$) with TC of approximately 0 can be obtained. The reason it called "reverse" is because the factor α modulates the CTAT voltage instead of the PTAT voltage.

To compensate the CTAT and PTAT voltage, a factor α<<1 is used, which results in a $V_{bgs}$ level of approximately 100 mV. Due to its small magnitude, $V_{bgs}$ may be difficult to use in some applications. Therefore, in some embodiments, the resistor feedback configuration is used to generate a BGR voltage with reasonable magnitude:

$$V_{BGR} = \left(1 + \frac{R_2}{R_1}\right) \times V_{bgs} \tag{6}$$

If assuming $R_1$ is fixed and $R_2$ is digitally controlled by the code ($D_{ext}$) as shown in FIG. 1, a configurable BGR voltage is generated, in accordance with various embodiments.

In process technology nodes where back-side power delivery may be applied and the substrate may not be available or be too thin to support traditional PNP structures, circuit 420 can be used for generating the scaled $V_{EB}$. Although a substrate is used to form the parasitic PNP, this PNP device can be replaced with a MOS device in sub-threshold as shown in circuit 420 FIG. 4B. Circuit 420 comprises current source Isrc, a resistor divider network comprising resistors R, and a pMOS device coupled as shown. Here, the scaled $V_{EB}$ is generated by replacing the PNP with pMOS device biasing in sub-threshold region. The resistors of various embodiments can be implemented as discrete resistors, resistors offered by the process technology node, transistors configured as resistors, or a combination of them. The bias voltage Vnbias and Vpbias can be generated by any suitable reference generator such as a voltage divider, resistor divider, current mirror based reference generator, an internal on-die reference generator, an off-die reference generator, or a combination of them.

Figure 5:
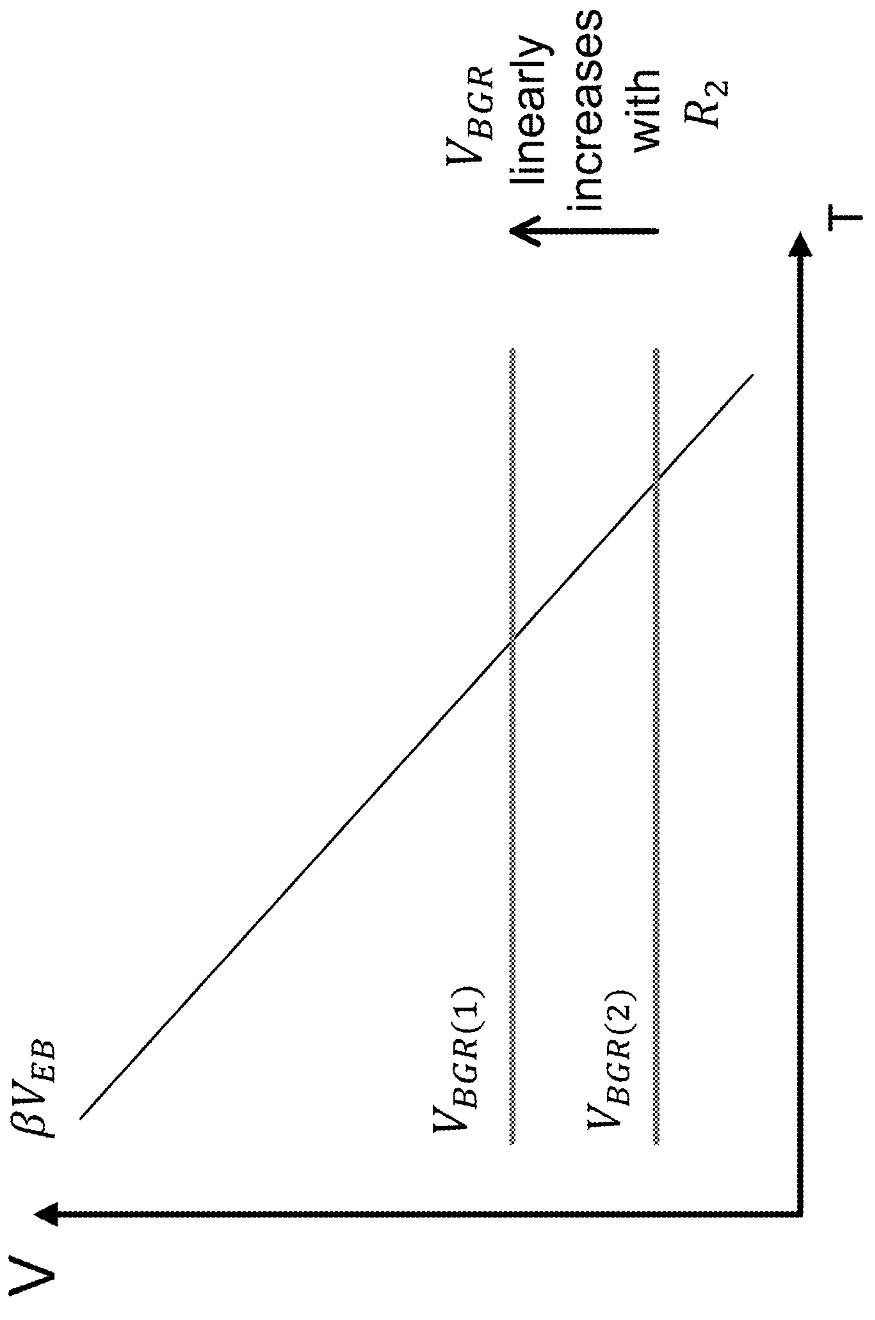
FIG. 5 illustrates a plot showing the low power hybrid reverse bandgap reference operating as a digital temperature sensor, in accordance with some embodiments.

FIG. 5 illustrates plot 500 showing the low power hybrid reverse bandgap reference operating as a digital temperature sensor, in accordance with some embodiments. As discussed with reference to FIG. 1, when Mux 106 selects Dout to adjust resistance R2, a DTS is realized. In some embodiments, LPHR 100 operates as a DTS to obtain the temperature information by comparing the scaled $V_{EB}$ voltage and the BGR voltage $V_{BGR}$. Its function and circuit implementation are illustrated as follows.

From equation (6) and after assuming $R_1$ is fixed and $R_2$ is tunable, the $V_{BGR}$ increases linearly with $R_2$. Thus, different bandgap voltages can be obtained such as $V_{BGR(1)}$ and $V_{BGR(2)}$ as shown in plot 500, and they are invariant with temperature. On the other hand, the $V_{EB}$ is a CTAT voltage with negative TC, so the temperature information can be obtained by comparing the $V_{EB}$ and $V_{BGR}$.

Since it is a voltage comparison and it's easy to generate a scaled CTAT voltage($\beta V_{EB}$), LPHR 100 significantly increases the working temperature range because it avoids the current comparator saturation problem existing temperature sensor circuits. Note, that the $\alpha V_{EB}$ may be too small for use in this comparison by comparator 102, so the other scaled CTAT voltage($\beta V_{EB}$) is used to compare $V_{BGR}$ with $\beta V_{EB}$, in accordance with some embodiments.

With the temperature change, the $\beta V_{EB}$ voltage decreases with temperature, while the $V_{BGR}$ is constant and linearly increases with $R_2$. Therefore, in various embodiments, changing $R_2$ (using different code $D_{out}$ as shown in FIG. 1) to make $V_{BGR}$ equal to $\beta V_{EB}$, the temperature information can be obtained from the value of $R_2$ ($D_{out}$) as, $$D_{out} = R_r\left[\frac{\beta(V_{go} + tcT)}{V_{bgs}} - 1\right] \tag{7}$$

where $$R_r = \frac{R_1}{R_{2u}}, R_{2u}$$

is the unit resistor of $R_2$, and based on the assumption, $$V_{EB} = V_{go} + tc \cdot T \tag{8}$$

where $V_{go}$ is approximately 1.2V, related to the silicon bandgap; tc is the TC of PNP devices.

In the DTS operating mode of LPHR 100, the $D_{out}$ codes are selected to control the tunable $R_2$, and comparator 102 and digital Successive Approximation (SAR) logic circuits 103 are added as shown in FIG. 1. At a given temperature, in various embodiments SAR logic 103 generates an initial code $D_{out}$ which results in a $V_{BGR(i)}$ that is compared with $\beta V_{EB}$. Based on the output of the comparator (Out), SAR logic 103 can automatically adjust the $D_{out}$ codes and after a number of clock cycles dictated by the required resolution, the final $D_{out}$ that ensures the $V_{BGR(i)}$ is equal to $\beta V_{EB}$ is obtained (as given by equation (7)).

Figure 6B:
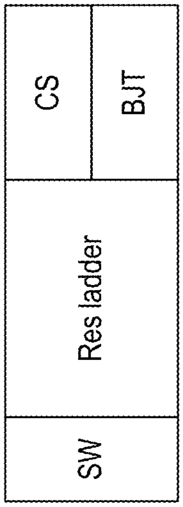
FIGS. 6A-B illustrates a layout of a bi-polar junction temperature device used in known bandgap circuits, and a layout of a single BJT device with a larger resistor ladder used in the low power hybrid reverse bandgap reference and digital temperature sensor, respectively, in accordance with some embodiments.
Figure 6A:
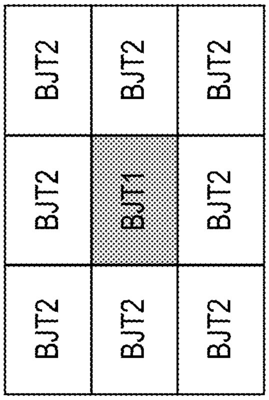

FIGS. 6A-B illustrates layout 600 of a bi-polar junction temperature device used in known bandgap circuits, and layout 620 of a single BJT device with a larger resistor ladder used in the low power hybrid reverse bandgap reference and digital temperature sensor, respectively, in accordance with some embodiments.

Most existing BGR/DTS circuits use a pair of BJT devices with size ratio of 1:8 to generate the required VEB voltages, and their layout structure is shown in FIG. 6A. In layout 600, one BJT is in the center and the other BJT is placed around to have a better matching performance. For example, BJT1 is in the center and BJT2 are placed around it.

Instead of the pair of BJT devices, a combination of a single BJT device with a large resistor ladder to generate the scaled VEB is a feature structure LPHR 100. Its layout structure is shown as in FIG. 6B, where a single BJT device, a large resistor array, switches ("SW") and a current source ("CS") generate the scaled VEBs. Circuit 100 and associated layout structure 620 provides an optimized layout which is less prone to BJT mismatch errors and lower power than the existing BGR/DTS designs.

Figure 7:
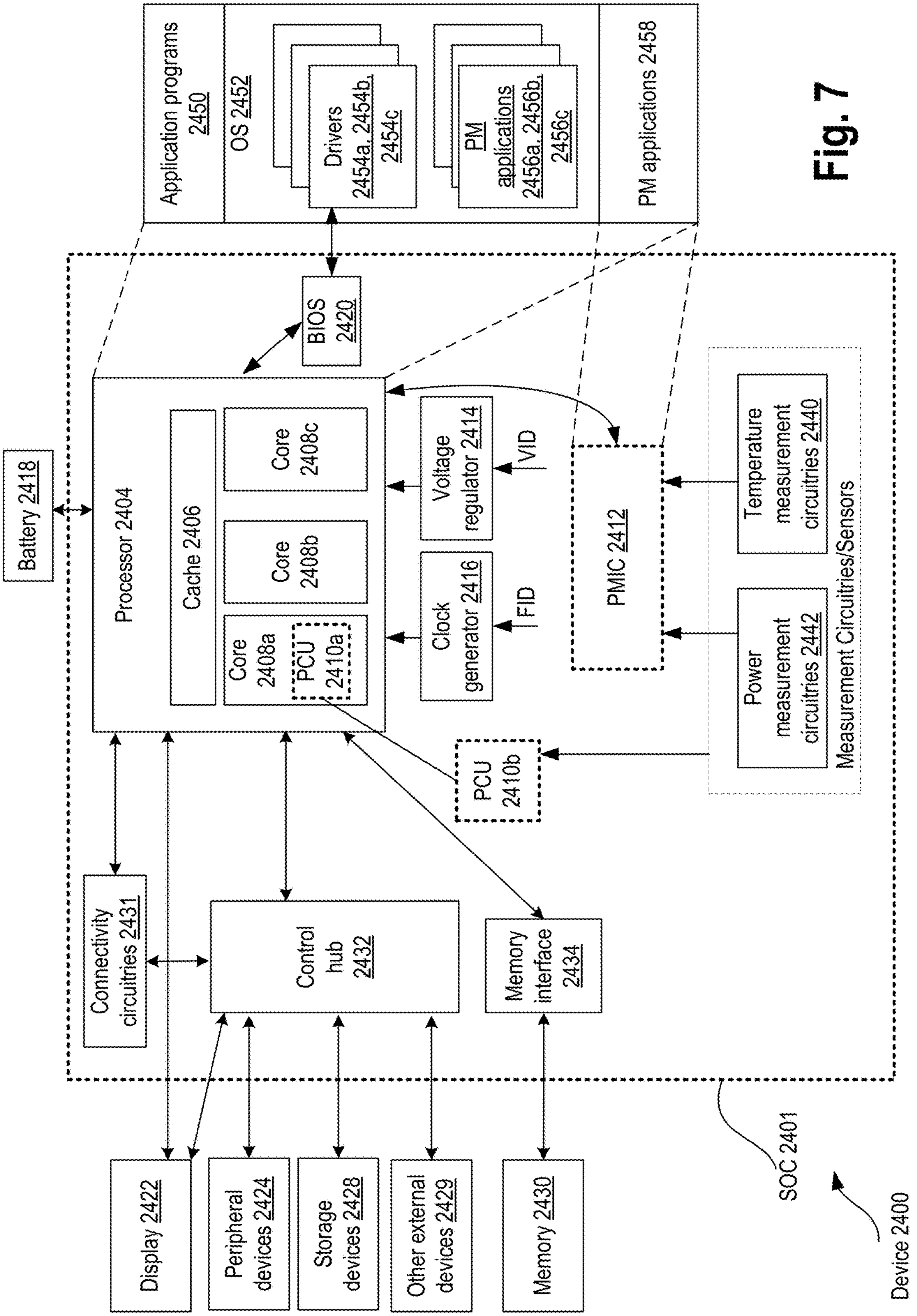
FIG. 7 illustrates a smart device or a computer system or a SoC (System-on-Chip) with low power hybrid reverse bandgap reference and digital temperature sensor, respectively, in accordance with some embodiments.

FIG. 7 illustrates a smart device or a computer system or a SoC (System-on-Chip) with low power hybrid reverse bandgap reference and digital temperature sensor, respectively, in accordance with some embodiments. In some embodiments, device 2400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 2400.

In an example, the device 2400 comprises an SoC (System-on-Chip) 2401. An example boundary of the SoC 2401 is illustrated using dotted lines in FIG. 7, with some example components being illustrated to be included within SoC 2401—however, SoC 2401 may include any appropriate components of device 2400.

In some embodiments, device 2400 includes processor 2404. Processor 2404 can include one or more physical devices, such as microprocessors, application processors, microcontrollers, programmable logic devices, processing cores, or other processing means. The processing operations performed by processor 2404 include the execution of an operating platform or operating system on which applications and/or device functions are executed. The processing operations include operations related to I/O (input/output) with a human user or with other devices, operations related to power management, operations related to connecting computing device 2400 to another device, and/or the like. The processing operations may also include operations related to audio I/O and/or display I/O.

In some embodiments, processor 2404 includes multiple processing cores (also referred to as cores) 2408*a*, 2408*b*, 2408*c*. Although merely three cores 2408*a*, 2408*b*, 2408*c* are illustrated in FIG. 7, processor 2404 may include any other appropriate number of processing cores, e.g., tens, or even hundreds of processing cores. Processor cores 2408*a*, 2408*b*, 2408*c* may be implemented on a single integrated circuit (IC) chip. Moreover, the chip may include one or more shared and/or private caches, buses or interconnections, graphics and/or memory controllers, or other components.

In some embodiments, processor 2404 includes cache 2406. In an example, sections of cache 2406 may be dedicated to individual cores 2408 (e.g., a first section of cache 2406 dedicated to core 2408*a*, a second section of cache 2406 dedicated to core 2408*b*, and so on). In an example, one or more sections of cache 2406 may be shared among two or more of cores 2408. Cache 2406 may be split in different levels, e.g., level 1 (L1) cache, level 2 (L2) cache, level 3 (L3) cache, etc.

In some embodiments, processor core 2404 may include a fetch unit to fetch instructions (including instructions with conditional branches) for execution by the core 2404. The instructions may be fetched from any storage devices such as the memory 2430. Processor core 2404 may also include a decode unit to decode the fetched instruction. For example, the decode unit may decode the fetched instruction into a plurality of micro-operations. Processor core 2404 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, the execution unit may execute instructions out-of-order. Hence, processor core 2404 may be an out-of-order processor core in one embodiment. Processor core 2404 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 2404 may also include a bus unit to enable communication between components of processor core 2404 and other components via one or more buses. Processor core 2404 may also include one or more registers to store data accessed by various components of the core 2404 (such as values related to assigned app priorities and/or sub-system states (modes) association.

In some embodiments, device 2400 comprises connectivity circuitries 2431. For example, connectivity circuitries 2431 includes hardware devices (e.g., wireless and/or wired connectors and communication hardware) and/or software components (e.g., drivers, protocol stacks), e.g., to enable device 2400 to communicate with external devices. Device 2400 may be separate from the external devices, such as other computing devices, wireless access points or base stations, etc.

In an example, connectivity circuitries 2431 may include multiple different types of connectivity. To generalize, the connectivity circuitries 2431 may include cellular connectivity circuitries, wireless connectivity circuitries, etc. Cellular connectivity circuitries of connectivity circuitries 2431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 2431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 2431 may include a network interface, such as a wired or wireless interface, e.g., so that a system embodiment may be incorporated into a wireless device, for example, a cell phone or personal digital assistant.

In some embodiments, device 2400 comprises control hub 2432, which represents hardware devices and/or software components related to interaction with one or more I/O devices. For example, processor 2404 may communicate with one or more of display 2422, one or more peripheral devices 2424, storage devices 2428, one or more other external devices 2429, etc., via control hub 2432. Control hub 2432 may be a chipset, a Platform Control Hub (PCH), and/or the like.

For example, control hub 2432 illustrates one or more connection points for additional devices that connect to device 2400, e.g., through which a user might interact with the system. For example, devices (e.g., devices 2429) that can be attached to device 2400 include microphone devices, speaker or stereo systems, audio devices, video systems or other display devices, keyboard or keypad devices, or other I/O devices for use with specific applications such as card readers or other devices.

As mentioned above, control hub 2432 can interact with audio devices, display 2422, etc. For example, input through a microphone or other audio device can provide input or commands for one or more applications or functions of device 2400. Additionally, audio output can be provided instead of, or in addition to display output. In another example, if display 2422 includes a touch screen, display 2422 also acts as an input device, which can be at least partially managed by control hub 2432. There can also be additional buttons or switches on computing device 2400 to provide I/O functions managed by control hub 2432. In one embodiment, control hub 2432 manages devices such as accelerometers, cameras, light sensors or other environmental sensors, or other hardware that can be included in device 2400. The input can be part of direct user interaction, as well as providing environmental input to the system to influence its operations (such as filtering for noise, adjusting displays for brightness detection, applying a flash for a camera, or other features).

In some embodiments, control hub 2432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 2422 represents hardware (e.g., display devices) and software (e.g., drivers) components that provide a visual and/or tactile display for a user to interact with device 2400. Display 2422 may include a display interface, a display screen, and/or hardware device used to provide a display to a user. In some embodiments, display 2422 includes a touch screen (or touch pad) device that provides both output and input to a user. In an example, display 2422 may communicate directly with the processor 2404. Display 2422 can be one or more of an internal display device, as in a mobile electronic device or a laptop device or an external display device attached via a display interface (e.g., DisplayPort, etc.). In one embodiment display 2422 can be a head mounted display (HMD) such as a stereoscopic display device for use in virtual reality (VR) applications or augmented reality (AR) applications.

In some embodiments, and although not illustrated in the figure, in addition to (or instead of) processor 2404, device 2400 may include Graphics Processing Unit (GPU) comprising one or more graphics processing cores, which may control one or more aspects of displaying contents on display 2422.

Control hub 2432 (or platform controller hub) may include hardware interfaces and connectors, as well as software components (e.g., drivers, protocol stacks) to make peripheral connections, e.g., to peripheral devices 2424.

It will be understood that device 2400 could both be a peripheral device to other computing devices, as well as have peripheral devices connected to it. Device 2400 may have a "docking" connector to connect to other computing devices for purposes such as managing (e.g., downloading and/or uploading, changing, synchronizing) content on device 2400. Additionally, a docking connector can allow device 2400 to connect to certain peripherals that allow computing device 2400 to control content output, for example, to audiovisual or other systems.

In addition to a proprietary docking connector or other proprietary connection hardware, device 2400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 2431 may be coupled to control hub 2432, e.g., in addition to, or instead of, being coupled directly to the processor 2404. In some embodiments, display 2422 may be coupled to control hub 2432, e.g., in addition to, or instead of, being coupled directly to processor 2404.

In some embodiments, device 2400 comprises memory 2430 coupled to processor 2404 via memory interface 2434. Memory 2430 includes memory devices for storing information in device 2400.

In some embodiments, memory 2430 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 2430 can be a dynamic random-access memory (DRAM) device, a static random-access memory (SRAM) device, flash memory device, phase-change memory device, or some other memory device having suitable performance to serve as process memory. In one embodiment, memory 2430 can operate as system memory for device 2400, to store data and instructions for use when the one or more processors 2404 executes an application or process. Memory 2430 can store application data, user data, music, photos, documents, or other data, as well as system data (whether long-term or temporary) related to the execution of the applications and functions of device 2400.

Elements of various embodiments and examples are also provided as a machine-readable medium (e.g., memory 2430) for storing the computer-executable instructions (e.g., instructions to implement any other processes discussed herein). The machine-readable medium (e.g., memory 2430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 2400 comprises temperature measurement circuitries 2440, e.g., for measuring temperature of various components of device 2400. In an example, temperature measurement circuitries 2440 may be embedded, or coupled or attached to various components, whose temperature are to be measured and monitored. For example, temperature measurement circuitries 2440 may measure temperature of (or within) one or more of cores **2408*a*, 2408*b*, 2408*c*, voltage regulator 2414, memory 2430, a mother-board of SoC 2401, and/or any appropriate component of device 2400. In some embodiments, temperature measurement circuitries 2440** include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device.

Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 2400 comprises power measurement circuitries 2442, e.g., for measuring power consumed by one or more components of the device 2400. In an example, in addition to, or instead of, measuring power, the power measurement circuitries 2442 may measure voltage and/or current. In an example, the power measurement circuitries 2442 may be embedded, or coupled or attached to various components, whose power, voltage, and/or current consumption are to be measured and monitored. For example, power measurement circuitries 2442 may measure power, current and/or voltage supplied by one or more voltage regulators 2414, power supplied to SoC 2401, power supplied to device 2400, power consumed by processor 2404 (or any other component) of device 2400, etc.

In some embodiments, device 2400 comprises one or more voltage regulator circuitries, generally referred to as voltage regulator (VR) 2414. VR 2414 generates signals at appropriate voltage levels, which may be supplied to operate any appropriate components of the device 2400. Merely as an example, VR 2414 is illustrated to be supplying signals to processor 2404 of device 2400. In some embodiments, VR 2414 receives one or more Voltage Identification (VID) signals, and generates the voltage signal at an appropriate level, based on the VID signals. Various type of VRs may be utilized for the VR 2414. For example, VR 2414 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 2410*a/b* and/or PMIC 2412. In some embodiments, each core has a network of distributed LDOs to provide efficient control for power management. The LDOs can be digital, analog, or a combination of digital or analog LDOs. In some embodiments, VR 2414 includes current tracking apparatus to measure current through power supply rail(s).

In some embodiments, VR 2414 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 2414 is completely eliminated (or substantially eliminated) and there is merely a single undershoot transition which could lead to a guaranteed Vmin based on a comparator delay and the di/dt of the load with the available output decoupling capacitance.

In some embodiments, device 2400 comprises one or more clock generator circuitries, generally referred to as clock generator 2416. Clock generator 2416 generates clock signals at appropriate frequency levels, which may be supplied to any appropriate components of device 2400. Merely as an example, clock generator 2416 is illustrated to be supplying clock signals to processor 2404 of device 2400. In some embodiments, clock generator 2416 receives one or more Frequency Identification (FID) signals, and generates the clock signals at an appropriate frequency, based on the FID signals.

In some embodiments, device 2400 comprises battery 2418 supplying power to various components of device 2400. Merely as an example, battery 2418 is illustrated to be supplying power to processor 2404. Although not illustrated in the figures, device 2400 may comprise a charging circuitry, e.g., to recharge the battery, based on Alternating Current (AC) power supply received from an AC adapter. In some embodiments, battery 2418 includes battery subsystem which comprises battery control and driver MOS (DrMOS) block.

In some embodiments, the charging circuitry (e.g., 2418) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 2400 comprises Power Control Unit (PCU) 2410 (also referred to as Power Management Unit (PMU), Power Controller, etc.). In an example, some sections of PCU 2410 may be implemented by one or more processing cores 2408, and these sections of PCU 2410 are symbolically illustrated using a dotted box and labelled PCU 2410*a*. In an example, some other sections of PCU 2410 may be implemented outside the processing cores 2408, and these sections of PCU 2410 are symbolically illustrated using a dotted box and labelled as PCU 2410*b*. PCU 2410 may implement various power management operations for device 2400. PCU 2410 may include hardware interfaces, hardware circuitries, connectors, registers, etc., as well as software components (e.g., drivers, protocol stacks), to implement various power management operations for device 2400.

In some embodiments, device 2400 comprises Power Management Integrated Circuit (PMIC) 2412, e.g., to implement various power management operations for device 2400. In some embodiments, PMIC 2412 is a Reconfigurable Power Management ICs (RPMICs) and/or an IMVP (Intel® Mobile Voltage Positioning). In an example, the PMIC is within an IC chip separate from processor 2404. The may implement various power management operations for device 2400. PMIC 2412 may include hardware interfaces, hardware circuitries, connectors, registers, etc., as well as software components (e.g., drivers, protocol stacks), to implement various power management operations for device 2400.

In an example, device 2400 comprises one or both PCU 2410 or PMIC 2412. In an example, any one of PCU 2410 or PMIC 2412 may be absent in device 2400, and hence, these components are illustrated using dotted lines.

Various power management operations of device 2400 may be performed by PCU 2410, by PMIC 2412, or by a combination of PCU 2410 and PMIC 2412. For example, PCU 2410 and/or PMIC 2412 may select a power state (e.g., P-state) for various components of device 2400. For example, PCU 2410 and/or PMIC 2412 may select a power state (e.g., in accordance with the ACPI (Advanced Configuration and Power Interface) specification) for various components of device 2400. Merely as an example, PCU 2410 and/or PMIC 2412 may cause various components of the device 2400 to transition to a sleep state, to an active state, to an appropriate C state (e.g., CO state, or another appropriate C state, in accordance with the ACPI specification), etc. In an example, PCU 2410 and/or PMIC 2412 may control a voltage output by VR 2414 and/or a frequency of a clock signal output by the clock generator, e.g., by outputting the VID signal and/or the FID signal, respectively. In an example, PCU 2410 and/or PMIC 2412 may control battery power usage, charging of battery 2418, and features related to power saving operation.

The clock generator 2416 can comprise a phase locked loop (PLL), frequency locked loop (FLL), or any suitable clock source. In some embodiments, each core of processor 2404 has its own clock source. As such, each core can operate at a frequency independent of the frequency of operation of the other core. In some embodiments, PCU 2410 and/or PMIC 2412 performs adaptive or dynamic frequency scaling or adjustment. For example, clock frequency of a processor core can be increased if the core is not operating at its maximum power consumption threshold or limit. In some embodiments, PCU 2410 and/or PMIC 2412 determines the operating condition of each core of a processor, and opportunistically adjusts frequency and/or power supply voltage of that core without the core clocking source (e.g., PLL of that core) losing lock when the PCU 2410 and/or PMIC 2412 determines that the core is operating below a target performance level. For example, if a core is drawing current from a power supply rail less than a total current allocated for that core or processor 2404, then PCU 2410 and/or PMIC 2412 can temporality increase the power draw for that core or processor 2404 (e.g., by increasing clock frequency and/or power supply voltage level) so that the core or processor 2404 can perform at higher performance level. As such, voltage and/or frequency can be increased temporality for processor 2404 without violating product reliability.

In an example, PCU 2410 and/or PMIC 2412 may perform power management operations, e.g., based at least in part on receiving measurements from power measurement circuitries 2442, temperature measurement circuitries 2440, charge level of battery 2418, and/or any other appropriate information that may be used for power management. To that end, PMIC 2412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 2410 and/or PMIC 2412 in at least one embodiment to allow PCU 2410 and/or PMIC 2412 to manage processor core energy at least in part based on value(s) detected by one or more of the sensors.

Also illustrated is an example software stack of device 2400 (although not all elements of the software stack are illustrated). Merely as an example, processors 2404 may execute application programs 2450, Operating System 2452, one or more Power Management (PM) specific application programs (e.g., generically referred to as PM applications 2458), and/or the like. PM applications 2458 may also be executed by the PCU 2410 and/or PMIC 2412. OS 2452 may also include one or more PM applications 2456*a*, 2456*b*, 2456*c*. The OS 2452 may also include various drivers 2454*a*, 2454*b*, 2454*c*, etc., some of which may be specific for power management purposes. In some embodiments, device 2400 may further comprise a Basic Input/output System (BIOS) 2420. BIOS 2420 may communicate with OS 2452 (e.g., via one or more drivers 2454), communicate with processors 2404, etc.

For example, one or more of PM applications 2458, 2456, drivers 2454, BIOS 2420, etc. may be used to implement power management specific tasks, e.g., to control voltage and/or frequency of various components of device 2400, to control wake-up state, sleep state, and/or any other appropriate power state of various components of device 2400, control battery power usage, charging of the battery 2418, features related to power saving operation, etc.

In some embodiments, battery 2418 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 2410*a/b* has a capability to enable extra compute and telemetries resources for the runtime support of the pCode. Here pCode refers to a firmware executed by PCU 2410*a/b* to manage performance of SoC 2401. For example, pCode may set frequencies and appropriate voltages for the processor. Part of the pCode are accessible via OS 2452. In various embodiments, mechanisms and methods are provided that dynamically change an Energy Performance Preference (EPP) value based on workloads, user behavior, and/or system conditions. There may be a well-defined interface between OS 2452 and the pCode. The interface may allow or facilitate the software configuration of several parameters and/or may provide hints to the pCode. As an example, an EPP parameter may inform a pCode algorithm as to whether performance or battery life is more important.

This support may be done as well by OS 2452 by including machine-learning support as part of OS 2452 and either tuning the EPP value that the OS hints to the hardware (e.g., various components of SoC 2401) by machine-learning prediction, or by delivering the machine-learning prediction to the pCode in a manner similar to that done by a Dynamic Tuning Technology (DTT) driver. In this model, OS 2452 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 2452 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 2414 includes a current sensor to sense and/or measure current through a high-side switch of VR 2414. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a first resistor; an amplifier having a first input coupled to the first resistor, and a second input to receive a scaled emitter-base voltage; and a second resistor having variable resistance, wherein the second resistor is coupled to the first input and an output of the amplifier, wherein the output of the amplifier is a bandgap reference.

Example 2: The apparatus of example 1, wherein the amplifier is an unbalanced amplifier having imbalanced input pair size or imbalanced biasing currents.

Example 3: The apparatus of example 1, wherein the amplifier comprises: a first input transistor having a first size; a second input transistor having a second size, wherein the first size is n times larger than the second size; a current mirror coupled to the first input transistor and a second input transistor; and a current source coupled to the first input transistor and a second input transistor.

Example 4: The apparatus of example 3, wherein the current mirror comprises: a third transistor which is diode-connected and coupled to the first input transistor, wherein the third transistor has a third size; and a fourth transistor coupled to the third transistor and the second input transistor, wherein the fourth transistor has a fourth size, wherein the fourth size is m times larger than the third size.

Example 5: The apparatus of example 1, wherein the scaled emitter-base voltage is a first scaled emitter-base voltage, wherein the apparatus comprises a comparator to compare the output of the amplifier with a second scaled emitter-base voltage.

Example 6: The apparatus of example 5 comprises a successive approximation logic to receive an output of the comparator and to generate a digital code, wherein the digital code changes according to the output of the comparator.

Example 7: The apparatus of example 6, wherein the digital code is a first digital code, wherein the apparatus comprises a multiplexer to select one of the first digital code or a second digital code, wherein an output of the multiplexer is to adjust the variable resistance of the second resistor.

Example 8: The apparatus of example 7, wherein when the multiplexer selects the first digital code, the first digital code indicates a temperature of the apparatus.

Example 9: The apparatus of example 5 comprising a circuitry to generate the first scaled emitter-base voltage and the second scaled emitter-base voltage, wherein the circuitry comprises: a resistor divider; a current source coupled to the resistor divider; and a transistor coupled to the current source and the resistor divider, wherein the resistor divider has a first tap to provide the first scaled emitter-base voltage and a second tap to provide the second scaled emitter-base voltage.

Example 10: The apparatus of example 9, wherein the transistor is one of a PNP BJT or a PMOS transistor.

Example 11: An apparatus comprising: an amplifier having an imbalanced input pair size or imbalanced biasing currents, wherein a voltage difference between inputs of the amplifier is a proportional-to-absolute-temperature (PTAT) voltage, and wherein an output of the amplifier is a bandgap voltage; and a comparator coupled to the output of the amplifier, wherein the comparator to compare the bandgap voltage with a scaled emitter-base voltage.

Example 12: The apparatus of example 11, wherein the scaled emitter-base voltage is a first scaled emitter-base voltage, wherein the inputs of the amplifier include: a first input coupled to a first resistor and a second resistor; and a second input to receive a second first scaled emitter-based voltage.

Example 13: The apparatus of example 12, wherein the amplifier comprises: a first input transistor having a first size, wherein the first input transistor is coupled to the second input; a second input transistor having a second size, wherein the second input transistor is coupled to the first input, wherein the first size is n times larger than the second size; a current mirror coupled to the first input transistor and a second input transistor; and a current source coupled to the first input transistor and a second input transistor.

Example 14: The apparatus of example 13, wherein the current mirror comprises: a third transistor which is diode-connected and coupled to the first input transistor, wherein the third transistor has a third size; and a fourth transistor coupled to the third transistor and the second input transistor, wherein the fourth transistor has a fourth size, wherein the fourth size is m times larger than the third size.

Example 15: The apparatus of example 11 comprises a successive approximation logic to receive an output of the comparator and to generate a digital code, wherein the digital code changes according to the output of the comparator.

Example 16: A system comprising: a memory; a processor coupled to the memory; and a wireless interface to allow the processor to communicate with another device, wherein the processor includes an apparatus operable to function as bandgap reference or a digital thermometer, wherein the apparatus includes: a first resistor; an amplifier having a first input coupled to the first resistor, and a second input to receive a scaled emitter-base voltage; and a second resistor having variable resistance, wherein the second resistor is coupled to the first input and an output of the amplifier, wherein the output of the amplifier is a bandgap reference.

Example 17: The system of example 16, wherein the amplifier is an unbalanced amplifier having imbalanced input pair size or imbalanced biasing currents.

Example 18: The system of example 16, wherein the amplifier comprises: a first input transistor having a first size; a second input transistor having a second size, wherein the first size is n times larger than the second size; a current mirror coupled to the first input transistor and a second input transistor; and a current source coupled to the first input transistor and a second input transistor.

Example 19: The system of example 18, wherein the current mirror comprises: a third transistor which is diode-connected and coupled to the first input transistor, wherein the third transistor has a third size; and a fourth transistor coupled to the third transistor and the second input transistor, wherein the fourth transistor has a fourth size, wherein the fourth size is m times larger than the third size.

Example 20: The system of example 16, wherein the scaled emitter-base voltage is a first scaled emitter-base voltage, wherein the apparatus comprises a comparator to compare the output of the amplifier with a second scaled emitter-base voltage.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:

a first resistor;

an amplifier having a first input coupled to the first resistor, and a second input to receive a scaled emitter-base voltage; and a second resistor having variable resistance, wherein the second resistor is coupled to the first input and an output of the amplifier, wherein the output of the amplifier is a bandgap reference.

2. The apparatus of claim 1, wherein the amplifier is an unbalanced amplifier having imbalanced input pair size or imbalanced biasing currents.

3. The apparatus of claim 1, wherein the amplifier comprises:

a first input transistor having a first size;

a second input transistor having a second size, wherein the first size is n times larger than the second size;

a current mirror coupled to the first input transistor and the second input transistor; and a current source coupled to the first input transistor and the second input transistor.

4. The apparatus of claim 3, wherein the current mirror comprises:

a third transistor which is diode-connected and coupled to the first input transistor, wherein the third transistor has a third size; and a fourth transistor coupled to the third transistor and the second input transistor, wherein the fourth transistor has a fourth size, wherein the fourth size is m times larger than the third size.

5. The apparatus of claim 1, wherein the scaled emitter-base voltage is a first scaled emitter-base voltage, wherein the apparatus comprises a comparator to compare the output of the amplifier with a second scaled emitter-base voltage.

6. The apparatus of claim 5 comprises a successive approximation logic to receive an output of the comparator and to generate a digital code, wherein the digital code changes according to the output of the comparator.

7. The apparatus of claim 6, wherein the digital code is a first digital code, wherein the apparatus comprises a multiplexer to select one of the first digital code or a second digital code, wherein an output of the multiplexer is to adjust the variable resistance of the second resistor.

8. The apparatus of claim 7, wherein when the multiplexer selects the first digital code, the first digital code indicates a temperature of the apparatus.

9. The apparatus of claim 5 comprising a circuitry to generate the first scaled emitter-base voltage and the second scaled emitter-base voltage, wherein the circuitry comprises:

a resistor divider;

a current source coupled to the resistor divider; and a transistor coupled to the current source and the resistor divider, wherein the resistor divider has a first tap to provide the first scaled emitter-base voltage and a second tap to provide the second scaled emitter-base voltage.

10. The apparatus of claim 9, wherein the transistor is one of a PNP BJT or a PMOS transistor.

11. An apparatus comprising:

an amplifier having an imbalanced input pair size or imbalanced biasing currents, wherein a voltage difference between inputs of the amplifier is a proportional-to-absolute-temperature (PTAT) voltage, and wherein an output of the amplifier is a bandgap voltage; and a comparator coupled to the output of the amplifier, wherein the comparator to compare the bandgap voltage with a scaled emitter-base voltage.

12. The apparatus of claim 11, wherein the scaled emitter-base voltage is a first scaled emitter-base voltage, wherein the inputs of the amplifier include:

a first input coupled to a first resistor and a second resistor; and a second input to receive a second first scaled emitter-based voltage.

13. The apparatus of claim 12, wherein the amplifier comprises:

a first input transistor having a first size, wherein the first input transistor is coupled to the second input;

a second input transistor having a second size, wherein the second input transistor is coupled to the first input, wherein the first size is n times larger than the second size;

a current mirror coupled to the first input transistor and the second input transistor; and a current source coupled to the first input transistor and the second input transistor.

14. The apparatus of claim 13, wherein the current mirror comprises:

a third transistor which is diode-connected and coupled to the first input transistor, wherein the third transistor has a third size; and a fourth transistor coupled to the third transistor and the second input transistor, wherein the fourth transistor has a fourth size, wherein the fourth size is m times larger than the third size.

15. The apparatus of claim 11 comprises a successive approximation logic to receive an output of the comparator and to generate a digital code, wherein the digital code changes according to the output of the comparator.

16. A system comprising:

a memory;

a processor coupled to the memory; and a wireless interface to allow the processor to communicate with another device, wherein the processor includes an apparatus operable to function as bandgap reference or a digital thermometer, wherein the apparatus includes:

a first resistor;

an amplifier having a first input coupled to the first resistor, and a second input to receive a scaled emitter-base voltage; and a second resistor having variable resistance, wherein the second resistor is coupled to the first input and an output of the amplifier, wherein the output of the amplifier is a bandgap reference.

17. The system of claim 16, wherein the amplifier is an unbalanced amplifier having imbalanced input pair size or imbalanced biasing currents.

18. The system of claim 16, wherein the amplifier comprises:

a first input transistor having a first size;

a second input transistor having a second size, wherein the first size is n times larger than the second size;

a current mirror coupled to the first input transistor and the second input transistor; and a current source coupled to the first input transistor and the second input transistor.

19. The system of claim 18, wherein the current mirror comprises:

a third transistor which is diode-connected and coupled to the first input transistor, wherein the third transistor has a third size; and a fourth transistor coupled to the third transistor and the second input transistor, wherein the fourth transistor has a fourth size, wherein the fourth size is m times larger than the third size.

20. The system of claim 16, wherein the scaled emitter-base voltage is a first scaled emitter-base voltage, wherein the apparatus comprises a comparator to compare the output of the amplifier with a second scaled emitter-base voltage.

* * * * *